United States Patent [19]

Numata et al.

[11] Patent Number: 5,194,579
[45] Date of Patent: Mar. 16, 1993

[54] FLUORINE-CONTAINING POLYAMIDE ACID AND POLYAMIDE

[75] Inventors: Shunichi Numata; Kooji Fujisaki; Noriyuki Kinjo, all of Hitachi, Japan

[73] Assignees: Hitachi, Ltd.; Hitachi Chemical Co., Ltd., both of Tokyo, Japan

[21] Appl. No.: 609,103

[22] Filed: Nov. 5, 1990

Related U.S. Application Data

[63] Continuation of Ser. No. 410,499, Sep. 21, 1989, abandoned, which is a continuation of Ser. No. 131,712, Dec. 11, 1987, abandoned, which is a continuation of Ser. No. 26,214, Mar. 16, 1987, abandoned, which is a continuation of Ser. No. 688,050, Dec. 11, 1984, abandoned.

[30] Foreign Application Priority Data

Apr. 11, 1983 [JP] Japan .................. 58-62080

[51] Int. Cl.$^5$ ............................. C08G 69/26
[52] U.S. Cl. ................................. 528/353
[58] Field of Search ............................ 528/353

[56] References Cited

U.S. PATENT DOCUMENTS

| | | | |
|---|---|---|---|
| 3,817,921 | 6/1974 | Brode | 528/185 |
| 3,959,350 | 5/1976 | Rogers | 528/185 |
| 4,173,700 | 11/1979 | Green | 528/342 |
| 4,384,107 | 5/1983 | Rogers | 528/185 |
| 4,393,194 | 7/1983 | Gaudiana | 528/185 |
| 4,477,648 | 10/1984 | Jones | 528/185 |
| 4,535,101 | 8/1985 | Lee | 528/353 |

FOREIGN PATENT DOCUMENTS

| | | | |
|---|---|---|---|
| 2416811 | 10/1975 | Fed. Rep. of Germany | 528/340 |
| 58-72924 | 5/1983 | Japan | 528/185 |
| 58-180531 | 10/1983 | Japan | 528/185 |
| 489766 | 2/1976 | U.S.S.R. | 528/185 |
| 491663 | 5/1976 | U.S.S.R. | 528/188 |

*Primary Examiner*—Paul R. Michl
*Assistant Examiner*—Edward J. Cain
*Attorney, Agent, or Firm*—Antonelli, Terry, Stout & Kraus

[57] ABSTRACT

Polyimides represented by general formula (I), (wherein $Ar_1$ and $Ar_2$ each represents an aromatic ring-containing group, Cf represents a fluorinated alkyl group directly bonded to $Ar_1$, and $m \geq 1$), and polyamide acids as their percursors. The polyimides have excellent humidity resistance and heat resistance, thus being useful as coating materials for semiconductor chips and insulating films for multi-layered wiring.

$$\left[ \begin{array}{c} Ar_1-N \\ | \\ (Cf)_m \end{array} \begin{array}{c} CO \\ \diagup \diagdown \\ \diagdown \diagup \\ CO \end{array} Ar_2 \begin{array}{c} CO \\ \diagup \diagdown \\ \diagdown \diagup \\ CO \end{array} N \right] \quad (I)$$

9 Claims, No Drawings

FLUORINE-CONTAINING POLYAMIDE ACID AND POLYAMIDE

This application is a continuation of application Ser. No. 07/410,499 filed Sept. 21, 1989, which is a continuation of application Ser. No. 131,712, filed Dec. 11, 1987, which is a continuation of application Ser. No. 026,214, filed Mar. 16, 1987, which is a continuation of application Ser. No. 688,050, filed Dec. 11, 1984 now abandoned.

TECHNICAL FIELD

This invention relates to fluorine-containing polyamide acids, polyimides obtained by curing the polyamide acids, and humidity-resistant and heat-resistant materials containing the said polyamides, which are useful as various electronics insulating films such as insulating films for semiconductor multi-layer wiring, a-ray shield films, flexible print circuit substrates, etc.

BACKGROUND ART

Recently, imide-based polymers have been used in surface-stabilized films on the exposed terminals of PN junction, interlayer insulating films of multi-layer wiring, α-ray shield films for preventing malfunctions of memory elements due to radiations (particularly, α-rays), flexible print circuit substrates, etc., but the ordinary polyimides have a high moisture absorbability in these applications and have various troubles due to this property. For example, an increase in leak current, corrosion of wiring materials (particularly in the case of aluminum), etc. are the problems. Furthermore, the moisture-absorbed polymers have problems such as swelling, when rapidly heated in the steps of gold wire bonding, solder reflow, etc.

As a result of studies of heat resistance and moisture absorbability of polymers having various chemical structures, the present inventors have found that polymers of low moisture absorbability generally have a poor heat resistance. For example, in comparison with polyimides having repetition units of the following formula (A), polyimides having repetition units of the following formula (B) have a moisture absorbability reduced to about ½, but have a lower thermal decomposition temperature even by 40° C.

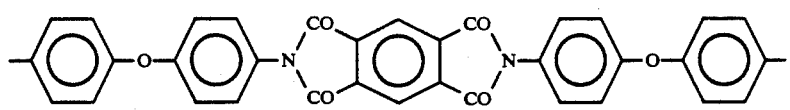

(A)

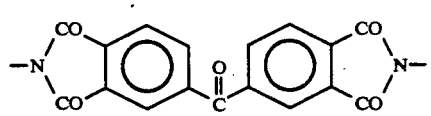

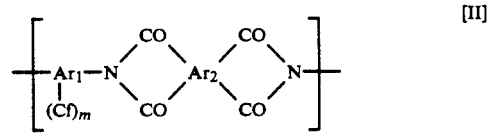

(B)

Likewise, polymers having repetition units of the following formula (C) have a moisture absorbability reduced to about ¼ and a lower thermal decomposition temperature by about 100° C., as compared with the polyimides of formula (A).

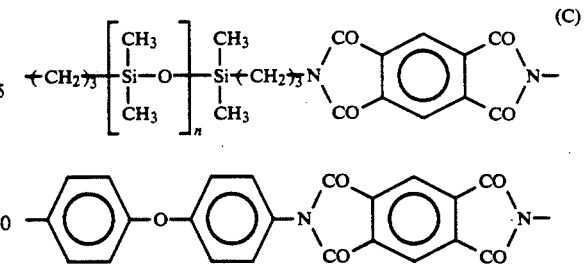

(C)

An object of the present invention is to provide novel polyimides having a low moisture absorbability and a distinguished heat resistance and being particularly useful for applications as various insulating films in electronics, and also provide polyamide acids as raw materials for them.

DISCLOSURE OF INVENTION

In summary, the first aspect of the present invention relates to polyamide acids characterized by containing repetition units represented by the following general formula I:

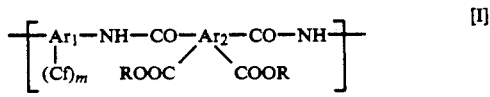

[I]

wherein $Ar_1$ and $Ar_2$ represent groups containing hydrocarbon rings; R represents hydrogen or alkyl groups having 1 to 4 carbon atoms; Cf represents a fluorinated alkyl group directly bonded to a hydrocarbon ring as a pendant radical $m \geq 1$.

The second aspect of the present invention relates to polyimides characterized by containing repetition units represented by the following general formula II:

[II]

$$\left[\begin{array}{c} Ar_1-N \begin{array}{c} CO \\ \diagup \\ \diagdown \\ CO \end{array} Ar_2 \begin{array}{c} CO \\ \diagup \\ \diagdown \\ CO \end{array} N \\ | \\ (Cf)_m \end{array}\right]$$

(wherein $Ar_1$, $Ar_2$, Cf and m have the same meanings as defined above for the said formula I).

The polyimides according to the present invention are materials having distinguished moisture resistance and heat resistance, and are useful as electric insulating materials, functioning materials, etc.

As least one of the following diamines is used as the

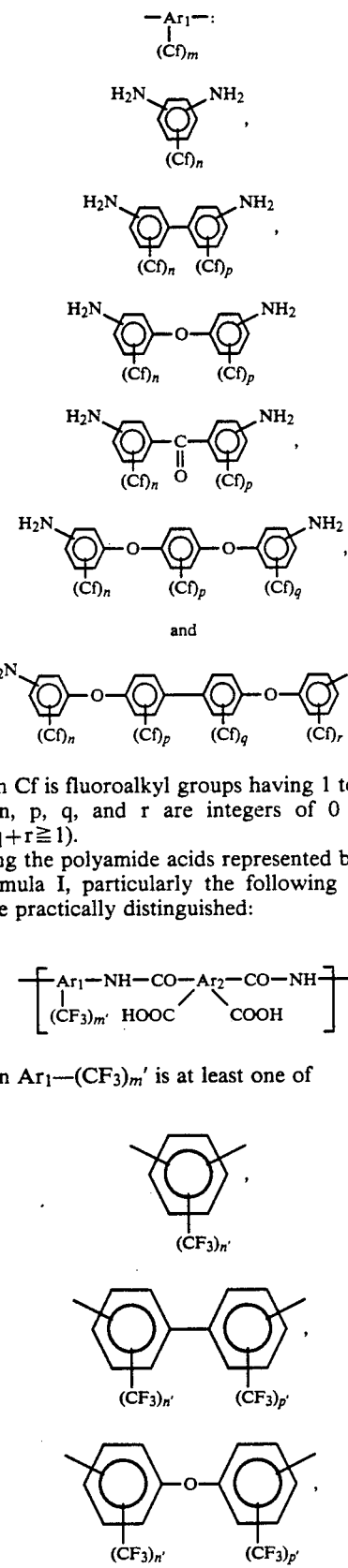

(wherein Cf is fluoroalkyl groups having 1 to 4 carbon atoms; n, p, q, and r are integers of 0 or 4 and $n+p+q+r \geq 1$).

Among the polyamide acids represented by the general formula I, particularly the following polyamide acids are practically distinguished:

$$\left[\begin{array}{c} Ar_1-NH-CO-Ar_2-CO-NH \\ | \\ (CF_3)_{m'} \quad HOOC \quad COOH \end{array}\right]$$

(wherein $Ar_1$—$(CF_3)_{m'}$ is at least one of

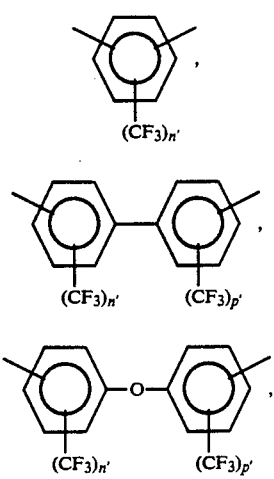

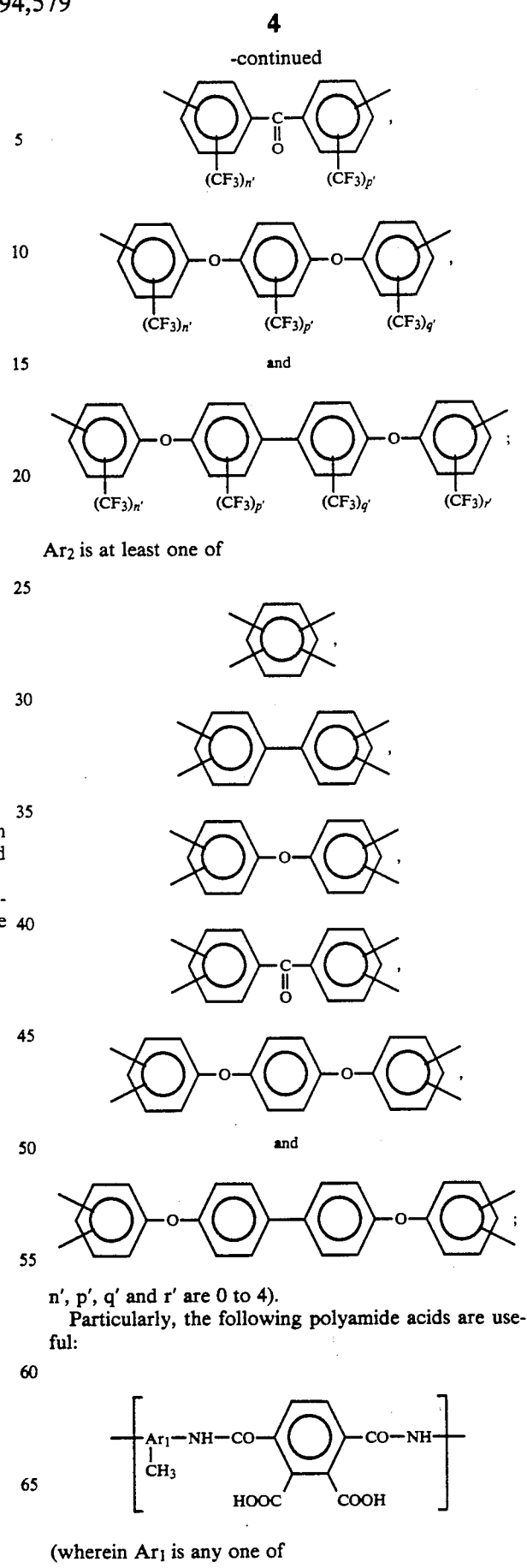

$Ar_2$ is at least one of n', p', q' and r' are 0 to 4).

Particularly, the following polyamide acids are useful:

$$\left[\begin{array}{c} Ar_1-NH-CO \underset{HOOC}{\overset{}{\bigcirc}} CO-NH \\ | \\ CH_3 \quad\quad COOH \end{array}\right]$$

(wherein $Ar_1$ is any one of

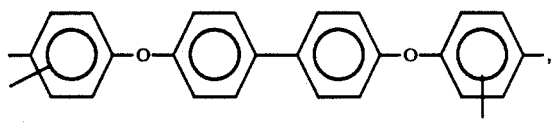

and

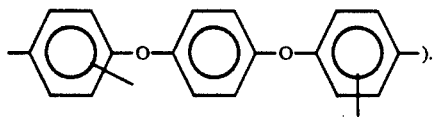

The polymides (formula II) of the present invention can be obtained by heating the polyamide acids, thereby imidizing them through dehydration and ring closure.

Among the present polyamide acids and polymides, it has been found that those obtained from pyromellitic acid dianhydride and 4,4'-bis[3-trifluoromethyl)-4-aminophenoxy] biphenyl, from pyromellitic acid dianhydride and p-bis[2-(trifluoromethyl)-4-aminophenoxy]benzene, and from pyromellitic acid dianhydride, benzophenone-3,3', 4,4'-tetracarboxylic acid dianhydride, 4,4'-bis[3-(trifluoromethyl) -4-aminophenoxy]-biphenyl, and 3-carbamoyl-4,4'-diaminodiphenyl ether have distinguished characteristics.

As a result of studies of heat resistance and moisture resistance of various polymers, the present inventors have found that polymers having a fluorinated alkyl group in the molecular structure have a high heat resistance and a low moisture absorbability.

The heat resistance includes a heat resistance from the viewpoint of thermal decomposition temperature and a heat resistance from the viewpoint of glass transition point (Tg). The present inventors have found that Tg generally has a decreasing tendency by introduction of a fluorinated alkyl group, and when the fluorinated alkyl group exists as a side chain through direct bonding to an aromatic ring, particularly to a benzene ring, the moisture absorbability decreases likewise, but the decrease in Tg is very small. Various polymers having such skeletons are available, among which it has been newly found as a result of studies from the overall viewpoints of thermal decomposition temperature, Tg, mechanical strength, processability, cost, etc. that polyimides containing repetition units represented by the said formula II according to the present invention are useful.

The present polyimides or their precursors polyamide acids can be obtained by introducing a fluorinated alkyl group into the aromatic ring of diamine, followed by their reaction.

Examples of diamines, in which the florinated alkyl group is directly bonded to the aromatic ring, as one of the raw materials in the present invention include: diaminobenzotrifluoride, bis(trifluoromethyl)-phenylenediamine, diaminotetra(trifluoromethyl)benzene, diamino(pentafluoroethyl)benzene, 2,2'-bis(trifluoromethyl)benzidine, 3,3'-bis(trifluoromethyl)benzidine, 2,2'-bis(trifluoromethyl) -4,4'-diaminodiphenyl ether, 3,3'-bis(trifluoromethyl) -4,4'-diaminodiphenyl ether, 3,3',5,5'-tetrakis(trifluoromethyl)-4,4'-diaminodiphenyl ether, 3,3'-bis(trifluoromethyl)-4,4'-diaminobenzophenone, bis(aminophenoxy) -di-(trifluoromethyl)benzene, bis(aminophenoxy) tetrakis(trifluoromethyl)benzene, bis[(trifluoromethyl)aminophenoxy]benzene, bis[(trifluoromethyl)aminophenoxy]-biphenyl, bis{[(trifluoromethyl)aminophenoxy]phenyl} hexafluoropropane, etc.

It is most reasonable to prepare the present polyamide acids through reaction of diamine and tetracarboxylic acid dianhydride given by the following general formulae in chemical equivalent amounts or amounts near thereto (particularly 0.9 to 1.1 moles of the diamine per mole of the carboxylic acid anhydride) in a solvent:

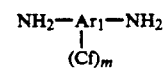

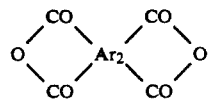

The solvent for use in the reaction can be N-methyl-2-pyrrolidone, etc. as used in the synthesis of polyamino acid so far well known.

The sheleton is which the fluorinated alkyl group is directly bonded to the aromatic ring in the present invention includes, for example, the following structural units:

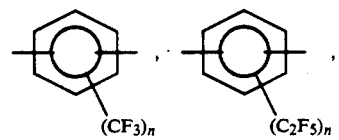

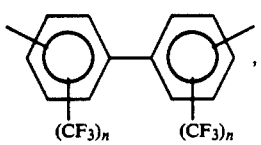

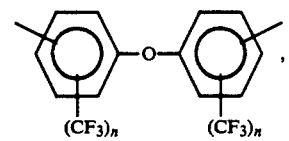

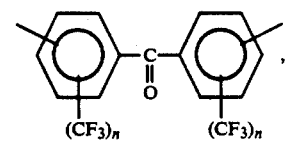

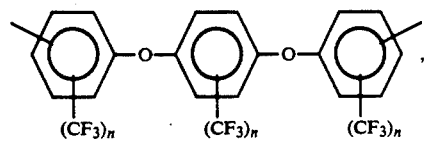

-continued

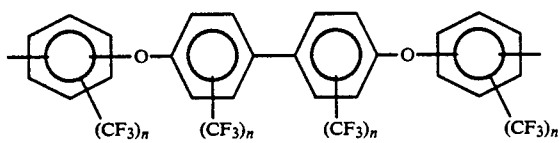

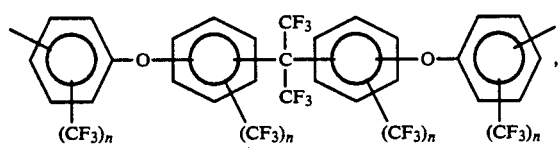

and

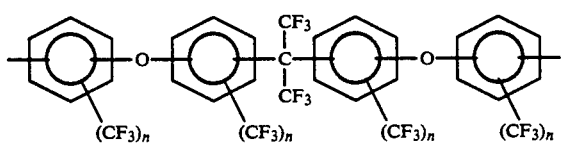

Examples of the aromatic diamine which can be used together with the said diamine include the following ones:

Diamines represented by the following general formula III:

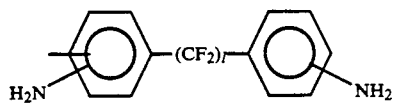

[V]

(wherein l is number of 1 to 6), for example, 1,3-bis-(aminophenyl)hexafluoropropane, or 2,2-bis[(aminophenoxy)phenyl]hexafluoropropane, bis{2-[(aminophenoxy)phenyl]hexafluoroisopropyl}benzene, m-phenylenediamine, p-phenylenediamine, benzidine, 4,4''-diaminoterphenyl, 4,4'''-diaminoquaterphenyl, 4,4'-diaminodiphenyl ether, 4,4'-aminodiphenylmethane, 4,4'-diaminodiphenyl sulfone, 2,2-bis(p-aminophenyl)propane, 1,5-diaminonaphthalene, 2,6-diaminonaphthalene, 3,3'-dimethylbenzidine, 3,3'-dimethoxybenzidine, 3,3'-dimethyl-4,4'-diaminodiphenyl ether, 3,3'-dimethyl-4,4'-diaminodiphenylmethane, 1,4-bis(p-aminophenoxy)benzene, 4,4'-bis(p-aminophenoxy) biphenyl, 2,2-bis[4-(p-aminophenoxy)phenyl] propane, 2,3,5,6-tetramethyl-p-phenylenediamine, etc.

To improve adhesion to glass, ceramics, and metals, silicon-containing diamines represented by the general formulae:

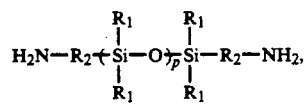

and

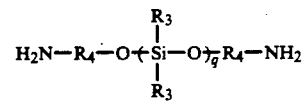

(wherein $R_2$ and $R_4$ are divalent organic groups; $R_1$ and $R_3$ are monovalent organic groups; p and q are integers of more than 1) can be used together.

In the synthesis of the present polyamino acids, the diamines and acid anhydrides given by the formulae [III] and [IV] should be the main raw materials. For example, the amount of diamine [III] should be 70% or more of the total diamine components and that of acid anhydride [IV] should be 50% or more of the total acid anhydrides, or otherwise no polyimides having both distinguished moisture resistance and heat resistance can be obtained.

The tetracarboxylic acid derivatives for use in the present invention include aromatic tetracarboxylic acids, or their acid dianhydrides, their partially esterified products with lower alcohols, etc. such as pyromellitic acid, 3,3',4,4'-tetracarboxybiphenyl, 2,3,3',4'-tetracarboxybiphenyl, 3,3',4,4'-tetracarboxydiphenyl ether, 2,3,3',4'-tetracarboxydiphenyl ether, 3,3',4,4'-tetra carboxybenzophenone, 2,3,3',4'-tetracarboxybenzophenone, 2,3,6,7-tetracarboxynaphthalene, 1,4,5,8-tetracarboxynaphthalene, 1,2,5,6-tetracarboxynaphthalene, 3,3',4,4'-tetracarboxydiphenylmethane, 2,2-bis(3,4-dicarboxyphenyl) propane, 2,2-bis(3,4-dicarboxyphenyl)hexafluoropropane, 3,3',4,4'-tetracarboxydiphenyl sulfone, 3,4,9,10-tetracarboxyperylene, 2,2-bis[4-(3,4-dicarboxyphenoxy)phenyl]propane, 2,2-bis[4-(3,4-dicarboxyphenoxy)phenyl]hexafluoropropane, etc.

The present polyamide acids can be synthesized in a solvent such as N-methyl-2-pyrrolidone (which will be hereinafter referred to as NMP), dimethylformamide, dimethylacetamide, sulfolane, cresol, xylenol, halogenated phenol, etc. The present polyamide acids have such a feature as a distinguished solubility in these solvents. Thus, a low cost solvent such as dichlorobenzene, acetone, methylethylketone, diacetone alcohol, etc. can be used as mixed.

The polyamide acids thus synthesized can be utilized, for example, as a varnish at a concentration of 1 to 30% (by weight, resin component) in the production of polyimide films, or used as a varnish as such in coating semiconductor chips (IC, LSI, etc.).

To improve the solvent resistance of polyimide, it is useful (i) to introduce an amino group, carbamoyl group or sulfamoyl group further into the diamine to form a rigid ladder structure after the curing, (ii) to introduce a nadic acid derivative or an unsaturated group such as ethinyl group, etc. therein to conduct heat cross-linking, and (iii) to introduce a hydroxyl group or carboxyl group into the polymer to conduct cross-linking by addition of a curing agent. In addition, tricarboxylic acid derivatives can be used together.

An example of synthesizing raw materials is given below:

SYNTHESIS EXAMPLE

Charged into a four-necked flask having a stirring rod, a reflux condenser with a water recipient, a thermometer and a nitrogen gas injection inlet were 10.3 g (0.0566 moles) of bisphenol, 100 g of dimethyl sulfoxide, and 16.4 g of toluene. They were mixed with stirring and subjected to dissolution. An aqueous solution of 4.5 g (0.113 moles) of sodium hydroxide in 4.5 g of water was added thereto, and the mixture was refluxed with stirring and dehydrated. After no water was evolved, the condenser was replaced with a Liebig condenser, and the mixture was heated up to about 160° C. to remove the remaining water and toluene therefrom by distillation.

Then, the residue was cooled to 100° C., and then 25.5 g (0.113 moles) of 2-nitro-5-chlorobenzotrifloride was added thereto, and the mixture was subjected to reaction with stirring for about 5 hours. The reaction mixture was poured into 1,000 ml of water, whereby yellow precipitates were formed. The precipitates were recovered by filtration and thoroughly washed with water, and dried at 60° C. under reduced pressure, whereby 30 g of 4,4'-bis[-(trifluoromethyl) -4-nitrophenoxy]biphenyl was obtained (yield: 94%).

Then, 30 g (0.053 moles) of 4,4'-bis[2-(trifluoromethyl) -4-nitrophenoxy]biphenyl was dissolved in 228 g of benzene, and activated iron consisting of 104 g of iron powder and 25 g of concentrated hydrochloric acid was added thereto. The mixture was heated at 70° C. for 2 hours with stirring. Then, 20 g of water was added thereto, and the mixture was further refluxed for 2 hours. After cooling, the benzene layer was separated. By evaporation of the benzene solution, yellow powder was obtained. It was found by infrared absorption spectrum that the nitro group was reduced to an amino group and 4,4'-bis[3-(trifluoromethyl)4-aminophenoxy]-biphenyl was formed, which will be hereinafter referred to as TFAPB.

BEST MODE FOR CARRYING OUT THE INVENTION

The present invention will be described in detail, referring to Examples.

Abbreviations of compound names in Examples are summarized below:

BPDA: biphenyl-3,3',4,4'-tetracarboxylic acid dianhydride
BTDA: benzophenone-3,3',4,4'-tetracarboxylic acid dianhydride
DAPP: 2,2-bis[4-(4-aminophenoxy)phenyl]propane
DAPFP: 2,2-bis[4-(4-aminophenoxy)phenyl]hexafluoropropane
DCPFP: 2,2-bis[4-(3,4-dicarboxyphenoxy)phenyl]hexaflluoropropane dianhydride
DFAPFP: 2,2-bis{4-[trifluoromethyl)-4-aminophenoxy] phenyl}hexafluoropropane
DDE: 4,4'-diaminodiphenyl ether
PMDA: pyromelltic acid dianhydride
TFAPB: 4,4'-bis[3-(trifluoromethyl)-4-aminophenoxy]-biphenyl

EXAMPLE 1

Charged in a four-necked flask having a stirring rod, a reflux condenser, a thermometer and a nitrogen gas injection inlet were 31.42 g (0.0623 moles) of TFAPB and 255 g of NMP, and they were dissolved. Then, 13.58 g (0.0623 moles) of PMDA was added thereto portion by portion, and then the mixture was subjected to reaction for about 5 hours, whereby a polyamide acid varnish was obtained.

The varnish was extended thinly on a glass plate and heated at 100° C. for one hour to prepare a film. The film was peeled off from the glass plate, and inserted between metal frames and heated at 200° C. for one hour and further at 400° C. for one hour to obtain a polyimide film (about 30 μm).

The heat resistance of the film was evaluated in the air, and it was found that the time of 3% reduction in amount was 6 minutes at 500° C., 20 minutes at 475° C., 70 minutes at 450° C., and 125 minutes at 425° C.

It is seen from this result that the temperature requiring 100 minutes for 3% reduction in amount (which is defined as thermal decomposition temperature) is 440° C.

As a result of subjecting the film to moisture absorption at 25° C. and 75% RH, it was found that the moisture absorbability was 0.7%, which was lower than that of the ordinary polyimide.

A glass transition temperature (Tg) was determined from a dimensional change measured by a thermomechanical analyzer at a constant rate temperature elevation at 10° C./ hour when the polyimide film was inserted between glass plates and heated to 400° C. It was found that Tg was 400° C.

COMPARATIVE EXAMPLE 1

(1) A polyamide acid varnish was synthesized in the following mixing ratio in the same manner as in Example 1, and further a polyimide film was prepared.

| 4,4'-(4-aminophenoxy)biphenyl | 28.27 g |
| PMDA | 16.73 g |
| NMP | 255 g |

Then, thermal decomposition temperature, moisture absorbability, and Tg were measured in the same manner as in Example 1, and were found to be 435° C., 2.05% and 340° C., respectively.

In comparison with the polyimide of Example 1, the said polyimide has a lower Tg by 60° C. and an about 3-fold moisture absorbability.

(2) A polyamide acid varnish was synthesized in the following mixing ratio in the same manner as in Example 1, and further a polyimide film was prepared. Then, thermal decomposition temperature, moisture absorbability and Tg were measured in the same manner as in Example 1, and were found to be 430° C., 1.7%, and 180° C., respectively.

| 1,3-bis(4-aminophenyl)hexafluoropropane | 26.28 g |
| PMDA | 18.72 g |
| NMP | 255 g |

In comparison with the polyimide of Example 1, Tg of the said polyimide was lower by more than 200° C., and the moisture absorbability was no more lowered.

(3) A polyamide acid varnish was synthesized in the following mixing ratio in the same manner as in Example 1, and further a polyimide film was prepared. Then, thermal decomposition temperature, moisture absorbability, and Tg were measured in the same manner as in Example 1, and were found to be 420° C., 1.2% and 150° C., respectively.

| 1,5-bis(4-aminophenyl)decafluoropentane | 29.28 g |
| PMDA | 15.72 g |
| NMP | 255 g |

Only introduction of $-(CF_2)_n-$ into the diamine skeleton as above lowers Tg, and does not too much lower the moisture absorbability.

EXAMPLE 2

A polyamide acid varnish was synthesized in the following mixing ratio in the same manner as in Example 1, and further a polyimide film was prepared.

| 2,5-diaminobenzotrifluoride | 15.90 g |
|---|---|
| BTDA | 29.10 g |
| NMP | 255 g |

Then, thermal decomposition temperature, moisture absorbability, and Tg were measured in the same manner as in Example 1, and were found to be 470° C., 0.6% and 350° C., respectively.

COMPARATIVE EXAMPLE 2

A polyamide acid varnish was synthesized in the following mixing ratio in the same manner as in Example 1, and further a polyimide film was prepared. p-phenylenediamine 11.31 g

| p-phenylenediamine | 11.31 g |
|---|---|
| BTDA | 33.69 g |
| NMP | 255 g |

Then, thermal decomposition temperature, moisture absorbability, and Tg were measured in the same manner as in Example 1, and were found to be 470° C., 3.0% and 370° C., respectively.

EXAMPLE 3

A polyamide acid varnish was synthesized in the following mixing ratio in the same manner as in Example 1, and further a polyimide film was prepared.

| p-bis[2-(trifluoromethyl)-4-aminophenoxy]benzene | 29.82 g |
|---|---|
| PMDA | 15.18 g |
| NMP | 255 g |

Then, thermal decomposition temperature, moisture absorbability, and Tg were measured in the same manner as in Example 1, and were found to be 440° C., 0.85% and 380° C., respectively.

COMPARATIVE EXAMPLE 3

A polyamide acid varnish was synthesized in the following mixing ratio in the same manner as in Example 1, and further a polyimide film was prepared.

| 1,4-bis(4-aminophenoxy)benzene | 24.65 g |
|---|---|
| PMDA | 20.35 g |
| NMP | 255 g |

Then, thermal decomposition temperature, moisture absorbability, and Tg were measured in the same manner as in Example 1, and were found to be 430° C., 2.22% and 325° C., respectively. In comparison with Example 3, the moisture absorbability was made much smaller and Tg was also made higher by about 50° C. by introduction of the trifluoromethyl group.

EXAMPLE 4

A polyamide acid varnish was synthesized in the following mixing ratio in the same manner as in Example 1, and further a polyimide film was prepared

| DFAPFP | 33.75 g |
|---|---|
| PMDA | 11.25 g |
| NMP | 255 g |

Then, thermal decomposition temperature, moisture absorbability and Tg were measured in the same manner as in Example 1, and were found to be 440° C., 0.5% and 360° C., respectively.

COMPARATIVE EXAMPLE 4

A polyamide acid varnish was synthesized in the following mixing ratio in the same manner as in Example 1, and further a polyimide film was prepared.

| DAPP | 29.39 g |
|---|---|
| PMDA | 15.61 g |
| NMP | 255 g |

Then, thermal decomposition temperature, moisture absorbability, and Tg were measured in the same manner as in Example 1, and were found to be 400° C., 0.9% and 350° C., respectively.

EXAMPLE 5

A polyamide acid varnish was synthesized in the following mixing ratio in the same manner as in Example 1, and further a polyimide film was prepared.

| DFAPFP | 20.04 g |
|---|---|
| DCPFP | 24.96 g |
| NMP | 255 g |

Then, thermal decomposition temperature, moisture absorbability, and Tg were measured in the same manner as in Example 1, and were found to be 430° C., 0.4% and 235° C.

COMPARATIVE EXAMPLE 5

A polyamide acid varnish was synthesized in the following mixing ratio in the same manner as in Example 1, and further a polyimide film was prepared.

| 2,2-bis{4-(aminophenoxy)phenyl}hexafluoropropane | 20.34 g |
|---|---|
| DCPFP | 24.66 g |
| NMP | 255 g |

Then, thermal decomposition temperature, moisture absorbability, and Tg were measured in the same manner as in Example 1, and were found to be 430° C., 0.6% and 220° C., respectively.

In comparison with Example 5, the moisture absorbability was 1.5-fold, and Tg was also a little lower.

EXAMPLE 6

A polyamide acid varnish was synthesized in the following mixing ratio in the same manner as in Example 1. Owing to the use of trimellitic acid anhydride, a low molecular weight oligomers were formed under the reaction conditions. Then, the varnish was applied to a glass plate, and heated, whereby a polyimide film partially having amide bonds was obtained.

| TFAPB | 24.21 g |
|---|---|
| DDE | 4.12 g |
| BPDA | 10.09 g |

| | |
|---|---|
| Trimellitic acid anhydride | 6.59 g |
| NMP | 255 g |

Then, thermal decomposition temperature, moisture absorbability, and Tg were measured in the same manner as in Example 1, and were found to be 400° C., 0.7% and 350° C., respectively.

COMPARATIVE EXAMPLE 6

A polyamide acid varnish was synthesized in the following mixing ratio in the same manner as in Example 1, and further a polyimide film was prepared.

Then, thermal decomposition temperature, moisture absorbability, and Tg were measured in the same manner as in Example 1, and were found to be 450° C., 1.8% and 370° C., respectively.

| | |
|---|---|
| 4,4'-bis(4-aminophenoxy)biphenyl | 20.30 g |
| DDE | 5.74 g |
| PMDA | 12.02 g |
| BPDA | 6.95 g |
| NMP | 255 g |

EXAMPLE 7

A modified polyamide acid varnish was synthesized in the following mixing ratio in the same manner as in Example 1, and further a polyimide film was prepared.

| | |
|---|---|
| TFAPB | 23.82 g |
| 3-carbamoyl-4,4'-diaminodiphenyl ether | 4.92 g |
| PMDA | 10.30 g |
| BPDA | 6.00 g |
| NMP | 255 g |

Then, the physical properties were measured in the same manner as in Example 1, and it was found that thermal decomposition temperature was 450° C., moisture absorbability 0.8%, and Tg 400° C.

EXAMPLE 8

A polyamide acid varnish was synthesized in the following mixing ratio in the same manner as in Example 1, and further a polyimide film was prepared.

| | |
|---|---|
| TFAPB | 23.48 g |
| DDE | 3.99 g |
| BPDA | 13.69 g |
| Trimellitic acid anhydride | 3.83 g |
| NMP | 255 g |

Then, thermal decomposition temperature, moisture absorbability and Tg were measured in the same manner as in Example 1, and were found to be 425° C., 0.78% and 315° C., respectively.

EXAMPLE 9

A polyamide acid varnish was synthesized in the following mixing ratio in the same manner as in Example 1, and further a polyimide film was prepared.

| | |
|---|---|
| DFADFP | 31.04 g |
| BPDA | 13.96 g |
| NNP | 255 g |

Thermal decomposition temperature, moisture absorbability and Tg of the film were 450° C., 0.53% and 305° C., respectively.

EXAMPLE 10

A polyamide acid varnish was synthesized in the following mixing ratio in the same manner as in Example 1, and further a polyimide film was prepared.

| | |
|---|---|
| TFAPB | 30.32 g |
| PMDA | 9.83 g |
| BTDA | 4.84 g |
| NMP | 255 g |

Thermal decomposition temperature, moisture absorbability and Tg of the film were 440° C., 0.73 and 350° C., respectively.

EXAMPLE 11

A polyamide acid varnish was synthesized in the following mixing ratio in the same manner as in Example 1, and further a polyimide film was prepared.

| | |
|---|---|
| 3,5-bis(aminophenoxy)-tert-nanofluorobutyl-benzene | 30.99 g |
| PMDA | 14.01 g |
| NMP | 255 g |

Then, thermal decomposition temperature, moisture absorbability, and Tg were measured in the same manner as in Example 1, and were found to be 420° C., 0.6% and 320° C., respectively.

EXAMPLE 12

A polyamide acid varnish was synthesized in the following mixing ratio in the same manner as in Example 1, and further a polyimide film was prepared. Then, thermal decomposition temperature, moisture absorbability and Tg were measured in the same manner as in Example 1, and were found to be 440° C., 0.35% and 430° C., respectively.

| | |
|---|---|
| 4,4'-bis(2-trifluoromethyl-4-aminophenoxy)-3,3',5,5'-tetrakis(trifluoromethyl)biphenyl | 34.84 g |
| PMDA | 10.16 g |
| NMP | 255 g |

INDUSTRIAL APPLICABILITY

As described in detail above, novel polyamide acids and polyimides are provided according to the present invention, and moisture-resistant and heat-resistant materials containing the said polyimides have remarkable effects in distinguished moisture resistance and heat resistance, different from the conventional ones. Thus, novel materials are provided in the field of electronics materials.

We claim:

1. A polyamide acid characterized by containing repetition units represented by the following general formula I:

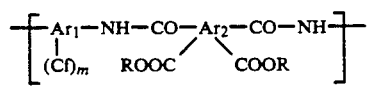  [I]

wherein $Ar_1$ and $Ar_2$ are groups containing aromatic hydrocarbon rings; R is hydrogen, or alkyl group having 1 to 4 carbon atoms; Cf is a fluorinated alkyl group directly bonded to a hydrocarbon ring as a pendent radical; and $m \geqq 1$.

2. A polyamide acid according to claim 1, wherein the

is one of

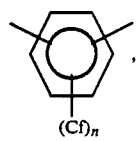

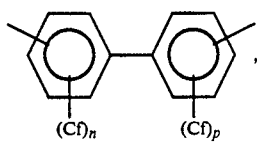

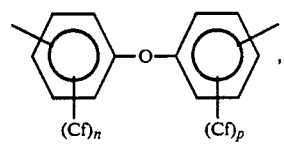

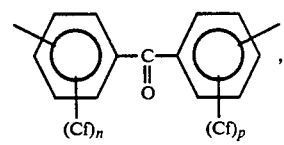

and

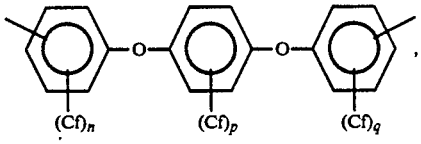

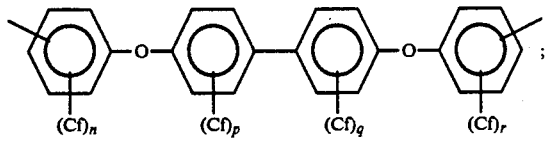

wherein Cf is a fluoroalkyl group having 1 to 4 carbon atoms, n, p, q and r are integers of 0 to 4; $16 \geqq n+p+q+r \geqq 1$ and m is equal to $n+p+q+r$.

3. A polyamide acid according to claim 1, wherein the general formula I is represented by the following formula:

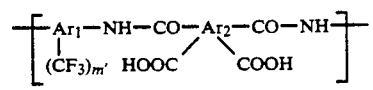

wherein $Ar_1-(CF_3)_{m'}$ is one of

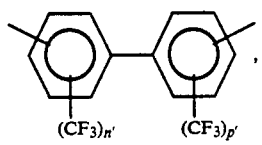

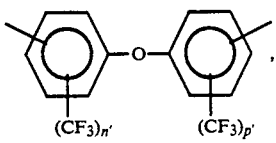

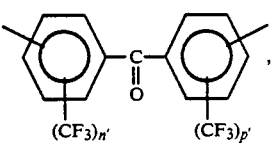

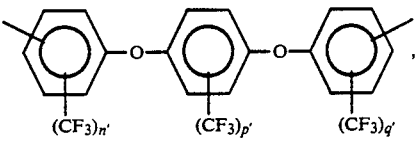

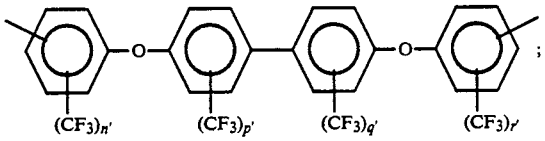

and

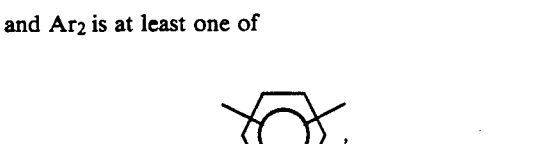

and $Ar_2$ is at least one of

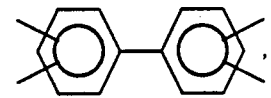

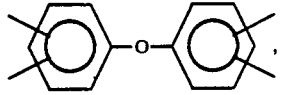

-continued

[structure: benzophenone-type with methyl substituents],

[structure: diphenyl ether with three rings], and

[structure: four-ring diether];

n', p', q' and r' are integers of 0 to 4; 16≧n'+p'+q'+r'≧1; and m' is equal to n'+p'+q'+r'.

4. A polyimide characterized by containing repetition units represented by the following general formula II:

$$\left[\begin{array}{c} Ar_1-N \\ | \\ (Cf)_m \end{array}\begin{array}{c}CO \\ \diagdown \\ CO\end{array} Ar_2 \begin{array}{c}CO \\ \diagup \\ CO\end{array} N \right] \quad [II]$$

wherein $Ar_1$ and $Ar_2$ are aromatic groups containing hydrocarbon rings; Cf is a fluorinated alkyl group directly bonded to a hydrocarbon ring as a pendent group; m≧1.

5. A polyimide according to claim 4, wherein the Cf has 1 to 4 carbon atoms.

6. A polyimide according to claim 4, wherein the $$-Ar_1 \atop | \atop (Cf)_m$$

is one of

[benzene ring with $(Cf)_n$],

[biphenyl with $(Cf)_n$, $(Cf)_p$],

[diphenyl ether with $(Cf)_n$, $(Cf)_p$],

[benzophenone with $(Cf)_n$, $(Cf)_p$],

-continued

[triphenyl diether with $(Cf)_n$, $(Cf)_p$, $(Cf)_q$], and

[four-ring diether with $(Cf)_n$, $(Cf)_p$, $(Cf)_q$, $(Cf)_r$];

wherein Cf is a fluoroalkyl group having 1 to 4 carbon atoms, n, p, q and r are integers of 0 to 4; 16≧n+p+q+r≧1 and m is equal to n+p+q+r.

7. A polyimide according to claim 4, wherein the general formula II is represented by the following formula:

$$\left[\begin{array}{c} Ar_1-N \\ | \\ (CF_3)_m \end{array}\begin{array}{c}CO \\ \diagdown \\ CO\end{array}\bigcirc\begin{array}{c}CO \\ \diagup \\ CO\end{array} N\right]$$

wherein $Ar_1 \atop | \atop (CF_3)_m$ is [benzene with $CF_3$],

[diphenyl ether three-ring with $CF_3$, $CF_3$], or

[four-ring diether with $CF_3$, $CF_3$].

8. A polyimide according to claim 4, wherein $-Ar_1- \atop | \atop (CF_3)_m$ is one of

[benzene with $(CF_3)_{n'}$],

[biphenyl with $(CF_3)_{n'}$, $(CF_3)_{p'}$],

-continued

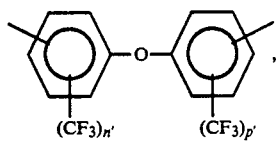

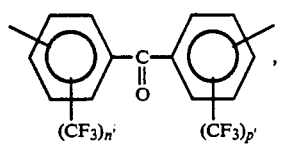

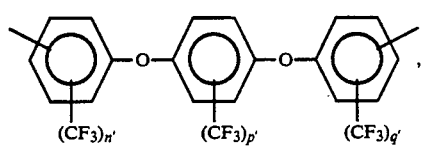

and

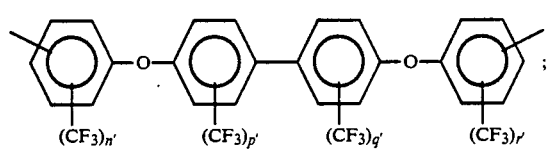

and Ar$_2$ is one of

-continued

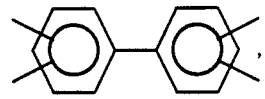

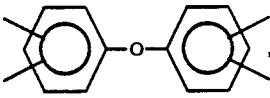

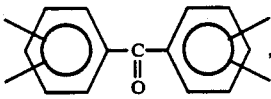

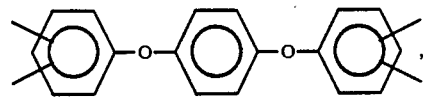

and

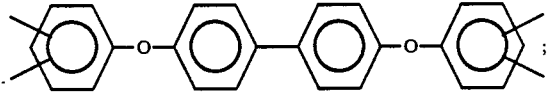

n', p', q' and r' are 0 to 4).

9. A polyamide acid according to claim 1, wherein said polyamide acid is obtained from pyromellitic acid dianhydride and 4,4'-bis biphenyl, or from pyromellitic acid dianhydride and p-bis benzene, or from pyromellitic acid dianhydride, benzophenone-3,3',4,4'-tetracarboxylic acid dianhydride, and 4,4'-bis biphenyl.

* * * * *